United States Patent
Satoh et al.

(10) Patent No.: US 7,629,862 B2
(45) Date of Patent: Dec. 8, 2009

(54) COMPOSITE DUPLEXER

(75) Inventors: Yuki Satoh, Osaka (JP); Naoki Yuda, Osaka (JP); Koji Hashimoto, Hyogo (JP); Toshio Ishizaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 177 days.

(21) Appl. No.: 11/568,772

(22) PCT Filed: May 19, 2006

(86) PCT No.: PCT/JP2006/310018

§ 371 (c)(1),
(2), (4) Date: Dec. 7, 2006

(87) PCT Pub. No.: WO2006/129499

PCT Pub. Date: Jul. 12, 2006

(65) Prior Publication Data

US 2009/0256645 A1 Oct. 15, 2009

(30) Foreign Application Priority Data

May 30, 2005 (JP) .............................. 2005-156805

(51) Int. Cl.
*H01P 1/10* (2006.01)
*H01P 5/12* (2006.01)
*H03H 7/46* (2006.01)

(52) U.S. Cl. ....................... 333/132; 333/101; 333/126; 333/129

(58) Field of Classification Search ................. 333/101, 333/104–107, 126–129, 132, 134, 262
See application file for complete search history.

(56) References Cited

U.S. PATENT DOCUMENTS 6,995,630 B2 * 2/2006 Satoh et al. .................. 333/133
7,324,493 B2 * 1/2008 Yamada et al. .............. 370/342
7,383,024 B2 * 6/2008 Mueller et al. ................ 455/78

FOREIGN PATENT DOCUMENTS

| JP | 11-313003 | 11/1999 |
| JP | 2002-368646 | 12/2002 |
| JP | 2004-328740 | 11/2004 |
| JP | 2005-64732 | 3/2005 |

* cited by examiner

*Primary Examiner*—Benny Lee
*Assistant Examiner*—Kimberly E Glenn
(74) *Attorney, Agent, or Firm*—Pearne & Gordon LLP

(57) ABSTRACT

A composite duplexer includes an antenna terminal, a first receiving terminal, a second receiving terminal, a transmitting terminal, a first switch, a duplexer, and a second switch. The first switch includes a first branch contact, a second branch contact connected with the transmitting terminal, a third branch contact connected with the second receiving terminal, and a first common contact connected with the first antenna terminal. The first common contact of the first switch is connected selectively with the first branch contact, the second branch contact, and the third branch contact. The first duplexer includes a first receiving filter connected with the first receiving terminal, and a first transmitting filter. The duplexer is connected with the first branch contact of the first switch. The second switch is operable to connect and disconnect electrically between the first transmitting filter of the first duplexer and the transmitting terminal. This composite duplexer can separate signals even if their frequency bands are close to each other.

2 Claims, 3 Drawing Sheets

US 7,629,862 B2

COMPOSITE DUPLEXER

TECHNICAL FIELD

The present invention relates to a composite duplexer used in a mobile communication device, such as a portable phone.

BACKGROUND ART

FIG. 3 is a block diagram of conventional composite duplexer 1. Composite duplexer 1 includes diplexer 4 connected with antenna 2, single-pole-double-throw (SPDT) switch 6 for low frequency bands connected with diplexer 4, and single-pole-double-throw (SPDT) switch 8 for high frequency bands connected with diplexer 4. SPDT switch 6 is connected with receiving terminal 10 and transmitting terminal 12 for low frequency bands, and switches the terminals. SPDT switch 8 is connected with receiving terminal 10 and transmitting terminal 12 for high frequency bands, and switches the terminals. A receiving circuit and a transmitting circuit are connected with receiving terminal 10 and transmitting terminal 12, respectively.

Composite duplexer 1 can be used in two transmission systems: the GSM900 system and the GSM1800 system using frequencies different from each other. Diplexer 4 separates a working frequency band in the GSM900 system from a working frequency band in the GSM1800 system.

Duplexer 1, when being used for the GSM900 system, a signal input from antenna 2 is separated by diplexer 4, is input to SPDT switch 6 for the low frequency bands, and output from receiving terminal 10 for the low frequency bands to be input to the receiving circuit. A signal output from the transmitting circuit is input to SPDT switch 6 from transmitting terminal 12 for the low frequency bands, and is output from antenna 2 via diplexer 4. SPDT switch 6 switches alternately receiving terminal 10 and transmitting terminal 12 for low frequency bands, thereby passing the input signal and the output signal to antenna terminal 4.

The frequency band in the GSM900 system is about 900 MHz, and the frequency band in the GSM1800 system is about 1.8 GHz. Thus, these frequency bands are widely separated, accordingly being separated by diplexer 4.

A GSM system, such as the GSM850 system in a frequency band of about 850 MHz, having low frequency band other than that of GSM1800 system, is very close to the frequency band of about 900 MHz in the GSM900 system, accordingly preventing diplexer from separating signals of the frequency bands.

SUMMARY OF THE INVENTION

A composite duplexer includes an antenna terminal, a first receiving terminal, a second receiving terminal, a transmitting terminal, a first switch, a duplexer, and a second switch. The first switch includes a first branch contact, a second branch contact connected with the transmitting terminal, a third branch contact connected with the second receiving terminal, and a first common contact connected with the first antenna terminal. The first common contact of the first switch is connected selectively with the first branch contact, the second branch contact, and the third branch contact. The first duplexer includes a first receiving filter connected with the first receiving terminal, and a first transmitting filter. The duplexer is connected with the first branch contact of the first switch. The second switch is operable to connect and disconnect electrically between the first transmitting filter of the first duplexer and the transmitting terminal.

This composite duplexer can separate signals even if their frequency bands are close to each other.

REFERENCE NUMERALS

20 Composite duplexer
22 Antenna (First Antenna)
22A Antenna Terminal (First Antenna Terminal)
24 Switch (First Switch)
24A Common Contact (First Common Contact)
24B Branch Contact (First Branch Contact)
24C Branch Contact (Second Branch Contact)
24D Branch Contact (Third Branch Contact)
26 Receiving Filter (First Receiving Filter)
28 Transmitting Filter (First Transmitting Filter)
30 Duplexer (First Duplexer)
32 Switch (Second Switch)
34 Receiving Terminal (First Receiving Terminal)
36 Transmitting Terminal
38 Receiving Terminal (Second Receiving Terminal)
42 Antenna (Second Antenna)
42A Antenna Terminal (Second Antenna Terminal)
44 Duplexer (Second Duplexer)
46 Receiving Terminal (Third Receiving Terminal)
82 Switch (Second Switch)
82A Common Contact (Second Common Contact)
82B Branch Contact (Fourth Branch Contact)
82C Branch Contact
82D Branch Contact (Fifth Branch Contact)
126 Receiving Filter (Second Receiving Filter)
128 Transmitting Filter (Second Transmitting Filter)

DETAIL DESCRIPTION OF THE PREFERRED EMBODIMENT

Figure 1:
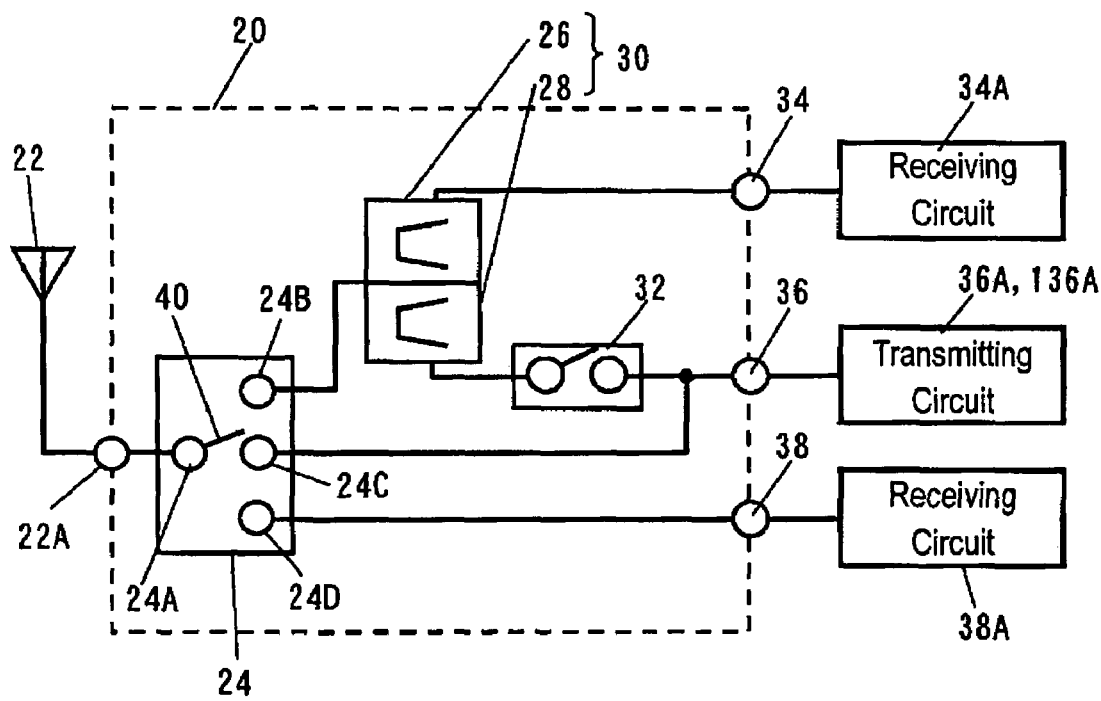
FIG. 1 is a block diagram of a composite duplexer in accordance with an exemplary embodiment of the present invention.

FIG. 1 is a block diagram of composite duplexer 20 in accordance with an exemplary embodiment of the present invention. Composite duplexer 20 includes switch 24 connected with antenna 22 via antenna terminal 22A, duplexer 30 connected with switch 24, and switch 32 connected with duplexer 30. Duplexer 30 includes receiving filter 26 and transmitting filter 28. Receiving filter 26 is connected with first receiving terminal 34. Transmitting filter 28 is connected with transmitting terminal 36 via switch 32.

Switch 24 is a single-pole-three-throw (SP3T) switch having switch conductor 40, common contact 24A, and three branch contacts 24B to 24D. Switch conductor 40 connects common contact 24A selectively with branch contacts 24B to 24D. Common contact 24A is connected with antenna terminal 22. Branch contacts 24B to 24D are connected with duplexer 30, transmitting terminal 36, and receiving terminal 38, respectively. Thus, antenna terminal 22A is connected selectively with duplexer 30, transmitting terminal 36, and receiving terminal 38.

Switch 32 is a single-pole-single-throw (SPST) switch which is operable to connect and disconnect electrically between transmitting filter 28 and transmitting terminal 26.

Receiving filter 26 and transmitting filter 28 of duplexer 30 are surface acoustic wave (SAW) filters. Receiving circuits 34A and 38A are connected with receiving terminals 34 and 38, respectively. Transmitting circuits 36A and 136A are connected with transmitting terminal 36.

Composite duplexer 20 can be used for communication systems using two frequency bands close to each other, for example, for the GSM850 system or the WCDMA850 system having frequency bands of about 850 MHz and the GSM900 system having a frequency band of about 900 MHz.

An operation of composite duplexer 20 will be described below. The receiving circuit connected with receiving terminal 34 receives a signal of the GSM850 system. Receiving circuit 38A connected with receiving terminal 38 receives a signal of the GSM900 system. Transmitting circuits 36A and 136A connected with transmitting terminal 36 transmit signals of the GSM850 system and the GSM900 system, respectively. Thus, transmitting terminal 36 is commonly used as the transmitting circuits. Receiving filter 26 passes the signal of the GSM850 system, and does not pass the signal of the GSM900 system. Transmitting filter 28 does not pass the signal of the GSM900 system.

If the signal of the GSM850 system is received, common contact 24A of SP3T switch 24 is connected with branch contact 24B, and SPST switch 32 is turned off. Then, the signal of the GSM850 system received at antenna 22 is sent to receiving circuit 34A via receiving filter 26 and receiving terminal 34, and is not sent to transmitting terminal 36 or receiving terminal 38.

If the signal of the GSM850 system is transmitted, common contact 24A of SP3T switch 24 is connected with branch contact 24C, and SPST switch 32 is turned off. Then, the signal generated by transmitting circuit 36A is transmitted from antenna 22 via switch conductor 40 of SP3T switch 24, and is not sent to receiving terminal 38. This signal is stopped with SPST switch 32 and SP3T switch 24 and is prevented from being sent to receiving terminal 34.

If the signal of the GSM900 system is received, common contact 24A of SP3T switch 24 is connected with branch contact 24D, and SPST switch 32 is turned off. Then, the signal of the GSM900 system received from antenna 22 is sent from receiving terminal 38 to receiving circuit 38A via switch conductor 40 of switch 24, and is not sent to receiving terminal 34 or transmitting terminal 36.

If the signal of the GSM900 system is transmitted, common contact 24A of SP3T switch 24 is connected with branch contact 24C, and SPST switch 32 is turned off. Then, the signal from transmitting circuit 36A is transmitted from antenna 22 via SP3T switch 24, and is not sent to receiving terminal 34 or 38.

If composite duplexer 20 receives the signal of the GSM900 system, one of the GSM850 system and the GSM900 system using frequency bands different from each other, the signal passes through switch 24 and does not pass through other switches or filters. Therefore, the signal of GSM900 system can be received and transmitted with a small loss.

If the signal of the WCDMA850 system is received, common contact 24A of SP3T switch 24 is connected with branch contact 24B, and SPST switch 32 is turned on. Then, the signal of the GSM850 system received at antenna 22 is sent to receiving circuit 36A via receiving filter 26 and receiving terminal 36, and is not sent to transmitting terminal 36 or receiving terminal 38.

If the signal of the WCDMA850 system is transmitted, common contact 24A of SP3T switch 24 is connected with branch contact 24B, and SPST switch 32 is turned on. Then, the signal generated by transmitting circuit 36A is transmitted from antenna 22 via switch conductor 40 of SP3T switch 24, and is not sent to receiving terminal 38. This signal is stopped with receiving filter 26 and is prevented from being sent to receiving terminal 34 either.

Figure 2:
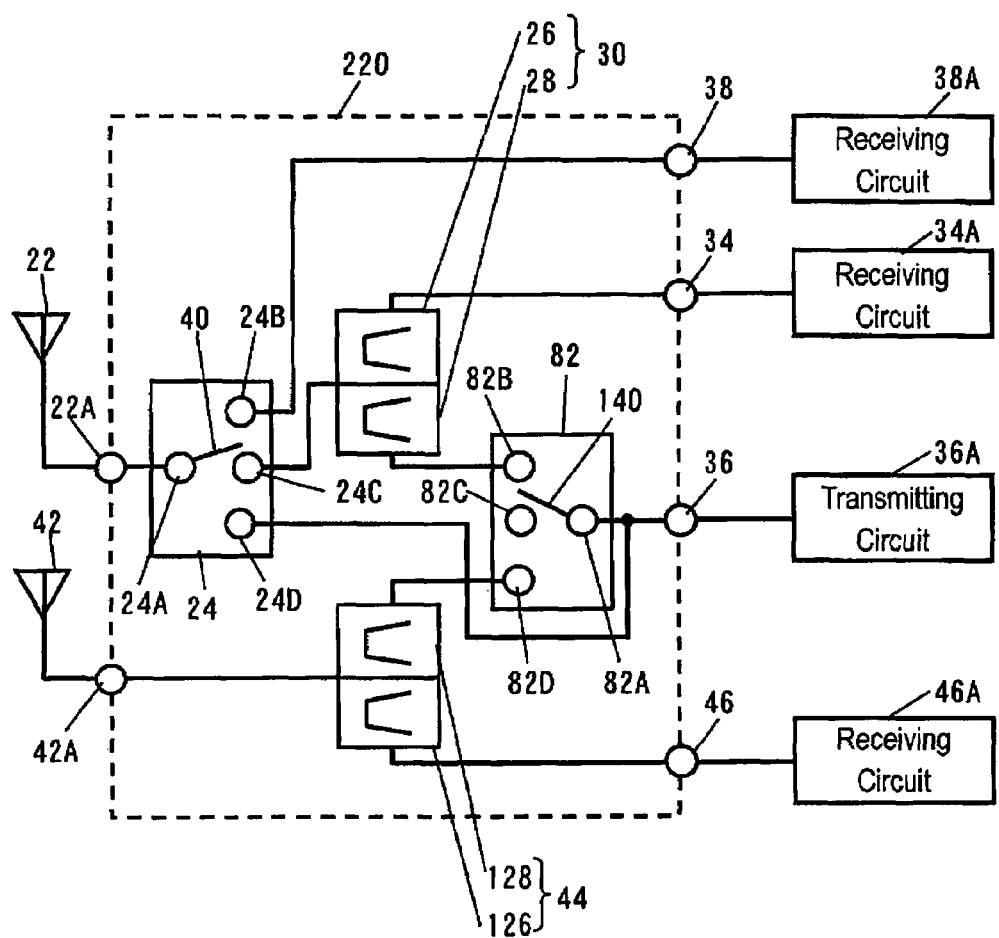
FIG. 2 is a block diagram of another composite duplexer in accordance with the embodiment.
Figure 3:
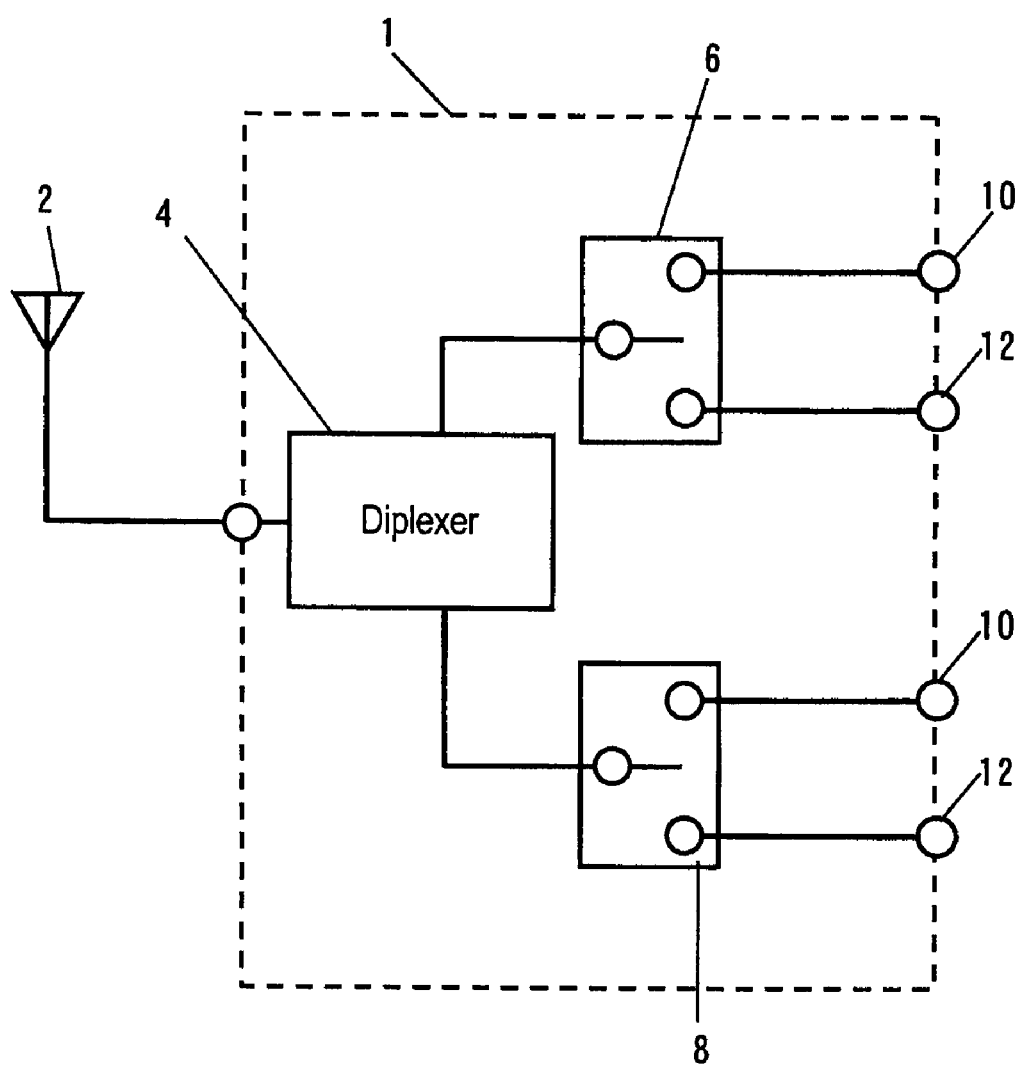
FIG. 3 is a block diagram of a conventional composite duplexer.

FIG. 2 is a block diagram of another composite duplexer 220 in accordance with the embodiment. In FIG. 2, components similar to those shown in FIG. 1 are denoted by the same reference numerals, and their descriptions will be omitted. Composite duplexer 220 further includes duplexer 44, receiving terminal 46, and antenna terminal 42A besides duplexer 20 shown in FIG. 1. Composite duplexer 220 includes SP3T switch 82 instead of SPST switch 32. Duplexer 44 includes receiving filter 126 and transmitting filter 128. Receiving terminal 46 is connected with receiving filter 126. Antenna 42 is connected with antenna terminal 42A.

SP3T switch 82 includes switch conductor 140, common contact 82A and three branch contacts 82B to 82D. Switch conductor 140 connects common contact 82A selectively with branch contacts 82B to 82D. Branch contact 82C is provided for opening common contact 82A and branch contacts 82B and 82D, and is connected with nothing, hence not necessarily being made of a conductor actually. Common contact 82A is connected with transmitting terminal 36 and branch contact 24D of SP3T switch 24. Branch contact 82B is connected with transmitting filter 28 of duplexer 30. SP3T switch 82 is operable to connect and disconnect electrically between transmitting filter 28 and transmitting terminal 36. Nothing is connected with branch contact 82C. Branch contact 82D is connected with transmitting filter 128 of duplexer 44. Transmitting terminal 36 and branch contact 24D of switch 24 are connected selectively with transmitting filters 28 and 128, and can be connected with nothing.

Receiving circuit 46A is connected with receiving terminal 46. Transmitting circuit 36A is connected with transmitting terminal 36.

Composite duplexer 220 can separate four signals of communication systems using frequency bands different from each other. Receiving circuit 34A receives a signal of 1900 MHz of the GSM1900 system and the WCDMA1900 system, and is connected with receiving terminal 34. Receiving circuit 38A receives a signal of 1800 MHz of the GSM1800 system, and is connected with receiving terminal 38. Receiving circuit 46A receives a signal of 2100 MHz of the WCDMA2100 system, and is connected with receiving terminal 46. Transmitting circuit 36A transmits signals of the above systems, and is connected with transmitting terminal 36.

An operation of composite duplexer 220 will be described below. If being used fir the GSM1900 system and the GSM1800 system, composite duplexer 220 operates similarly to composite duplexer 20 shown in FIG. 1.

If a signal of GSM1900 system is received, common contact 24A of SP3T switch 24 is connected with branch contact 24B, and SP3T switch 82 is opened, that is, switch conductor 140 connects common contact 82A with branch contact 82C. Then, the signal of the GSM1900 system received at antenna 22 is sent to receiving circuit 34A via receiving filter 26 and receiving terminal 34, and is not sent to transmitting terminal 36 or receiving terminal 38 or 46.

If the signal of the GSM1900 system is transmitted, common contact 24A of SP3T switch 24 is connected with branch contact 24C, and common contact 82A of SP3T switch 82 is connected with branch contact 82B. Then, the signal generated by transmitting circuit 36A is transmitted from antenna 22 via switch conductor 40 of SP3T switch 24, and is not sent to receiving terminal 38 or 46. This signal is stopped with SP3T switch 24, and is not sent to receiving terminal 34 either.

If a signal of the GSM1800 system is received, common contact 24A of SP3T switch 24 is connected with branch contact 24B, and SP3T switch 82 is opened, that is, switch conductor 140 connects common contact 82A with branch contact 82C. Then, the signal of the GSM1800 system received from antenna 22 is sent from receiving terminal 38 to receiving circuit 38A via switch conductor 40 of switch 24, and is not sent to receiving terminal 34 or 46 or transmitting terminal 36.

If the signal of the GSM1800 system is transmitted, common contact 24A of SP3T switch 24 is connected with branch contact 24D, and SP3T switch 32 is opened, that is, switch conductor 140 connects common contact 82A with branch contact 82C. Then, the signal from transmitting circuit 38A is transmitted from antenna 22 via SP3T switch 24, and is not sent to receiving terminal 34, 38, or 46.

If using the WCDMA1900 system, composite duplexer 220 operates as follows.

If a signal of the WCDMA1900 system is received, common contact 24A of SP3T switch 24 is connected with branch contact 24C, and switch conductor 140 of SP3T switch 82 connects common contact 82A to branch contact 82B. Then, the signal of the WCDMA1900 system received at antenna 22 is sent to receiving circuit 34A via receiving filter 26 and receiving terminal 34, and is not sent to transmitting terminal 36 or receiving terminal 38 or 46.

If the signal of the WCDMA1900 system is transmitted, common contact 24A of SP3T switch 24 is connected with branch contact 24C, and common contact 82A of SP3T switch 82 is connected with branch contact 82B. Then, the signal generated by transmitting circuit 36A is transmitted from antenna 22 via switch conductor 40 of SP3T switch 24, and is not sent to receiving terminal 38 or 46. This signal is stopped with transmitting filter 28, preventing from being sent to receiving terminal 34.

Antenna 42 receives and transmits a signal of the WCDMA2100 system.

If the signal of the WCDMA2100 system is received, switch conductor 140 of switch 82 connects common contact 82A to branch contact 82D. Then, receiving circuit 46A receives the signal of the WCDMA2100 system received at antenna 42 via receiving filter 126. The signal of the WCDMA2100 system generated by transmitting circuit 36A is transmitted from antenna 42 via transmitting filter 128.

Composite duplexer 20 shown in FIG. 1 and composite duplexer 220 shown in FIG. 2 may be combined.

This combination can separate respective two frequency bands of two communication systems from each other even if these frequency bands are different from each other but close to each other.

When one of the two communication systems is used, SP3T switch 24 is activated to connect common contact 24A selectively with branch contact 24B and branch contact 24C which is connected with transmitting terminal 36. When common contact 24A is connected with branch contact 24B, switch 82 is opened. When common contact 24A is connected with branch contact 24C, switch 82 is turned on.

When the other of the two communication systems is used, SP3T switch 24 is activated to connect common contact 24A selectively with branch contact 24D and branch contact 24C. Switch 82 is always opened.

Composite duplexer 220 shown in FIG. 2 corresponding to the GSM1800 system, the GSM1900 system, the WCDMA1900 system, and the WCDMA2100 system is influenced by impedance characteristics of transmitting filter 128 due to its frequency band especially when a signal of each of the GSM1800 system and the GSM1900 system is transmitted. This influence can be eliminated by connecting branch contact 82C of SP3T switch 82, which has been connected with nothing, to transmitting terminal 36, thereby providing composite duplexer 220 with high performance.

In composite duplexer 220, a signal of each of the GSM1800 system and the GSM1900 system to be transmitted passes through only switch 24. Thus, composite duplexer 220 can switch the transmitting and receiving of signals and switch communication systems with a minimum number of switches, accordingly reducing a loss and power consumption of a communication apparatus.

INDUSTRIAL APPLICABILITY

A composite duplexer according to the present invention can separate signals from each other even if their frequency bands are close to each other, and hence, is useful for a mobile communication device, such as a portable phone.

The invention claimed is:

1. A composite duplexer comprising:
a first antenna terminal arranged to be connected with a first antenna;
a first receiving terminal arranged to be connected with a first receiving circuit;
a second receiving terminal arranged to be connected with a second receiving circuit;
a transmitting terminal arranged to be connected with a transmitting circuit;
a first switch including,
a first branch contact,
a second branch contact connected with the transmitting terminal,
a third branch contact connected with the second receiving terminal, and
a first common contact connected with the first antenna terminal, the first common contact being connected selectively with the first branch contact, the second branch contact, and the third branch contact;
a first duplexer connected with the first branch contact of the first switch, the first duplexer including
a first receiving filter connected with the first receiving terminal, and
a first transmitting filter; and
a second switch operable to connect and disconnect electrically between the first transmitting filter of the first duplexer and the transmitting terminal.

2. The composite duplexer of claim 1, further comprising:
a second antenna terminal arranged to be connected with a second antenna;
a third receiving terminal arranged to be connected with a third receiving circuit;
a second duplexer connected with the second antenna terminal, the second duplexer including
a second receiving filter connected with the third receiving terminal, and
a second transmitting filter,
wherein the second switch includes
a fourth branch contact connected with the first transmitting filter,
a fifth branch contact connected with the second transmitting filter of the second duplexer, and
second common contact connected with the transmitting terminal, the first common contact being connected selectively with the fourth branch contact and the fifth branch contact.

* * * * *